United States Patent [19]

Evans

[11] 4,168,642
[45] Sep. 25, 1979

[54] BROCCOLI QUARTERING MACHINE

[75] Inventor: Owen H. Evans, Le Sueur, Minn.

[73] Assignee: Green Giant Company, Chaska, Minn.

[21] Appl. No.: 846,373

[22] Filed: Oct. 28, 1977

[51] Int. Cl.² .......................... B26D 1/28; B26D 3/26
[52] U.S. Cl. .................... 83/404.3; 83/409.2; 83/425.1
[58] Field of Search .................. 83/404.2, 407, 408, 83/425.1, 409.2, 404.3

[56] References Cited

U.S. PATENT DOCUMENTS

| 1,992,714 | 2/1935 | Nelson | 83/407 |
| 2,116,194 | 5/1938 | Fink | 83/404.2 X |
| 2,571,531 | 10/1951 | Bridge | 83/409.2 X |
| 3,096,801 | 7/1963 | Miles et al. | 83/404.2 |
| 3,114,403 | 12/1963 | Rianda | 83/407 |
| 3,154,124 | 10/1964 | Cimino | 83/409.2 X |
| 3,320,989 | 5/1967 | Verardo | 99/635 |
| 3,478,794 | 11/1969 | Alpen | 83/404.2 X |
| 3,478,795 | 11/1969 | Thornsbery | 99/639 |
| 3,646,977 | 3/1972 | Goodale | 99/635 |

FOREIGN PATENT DOCUMENTS 418929  11/1934  United Kingdom ................. 83/404.2

Primary Examiner—Willie G. Abercrombie
Attorney, Agent, or Firm—Allegretti, Newitt, Witcoff & McAndrews

[57] ABSTRACT

A broccoli quartering machine for quartering spears of broccoli includes a conveyor adapted to move in a lineal path and having rigid plates upon which are mounted resilient, conical, cup-shaped holding members for holding the individual spears of broccoli. The apex of the cup-shaped members extends downward through an opening in each plate and is open, and each cup-shaped member includes at least two pairs of slots which extend from the open apex upward toward the base of the cup-shaped member. A plurality of cam followers are mounted on the cup-shaped members and contact a guide strip on the machine frame so as to align one pair of the slots with a first cutting disc and to engage a cam on the machine frame to rotate the cup-shaped member and the spear of broccoli therein 90° between the first cutting disc and the second cutting disc so as to align the remaining pair of slots with the second cutting disc.

28 Claims, 6 Drawing Figures

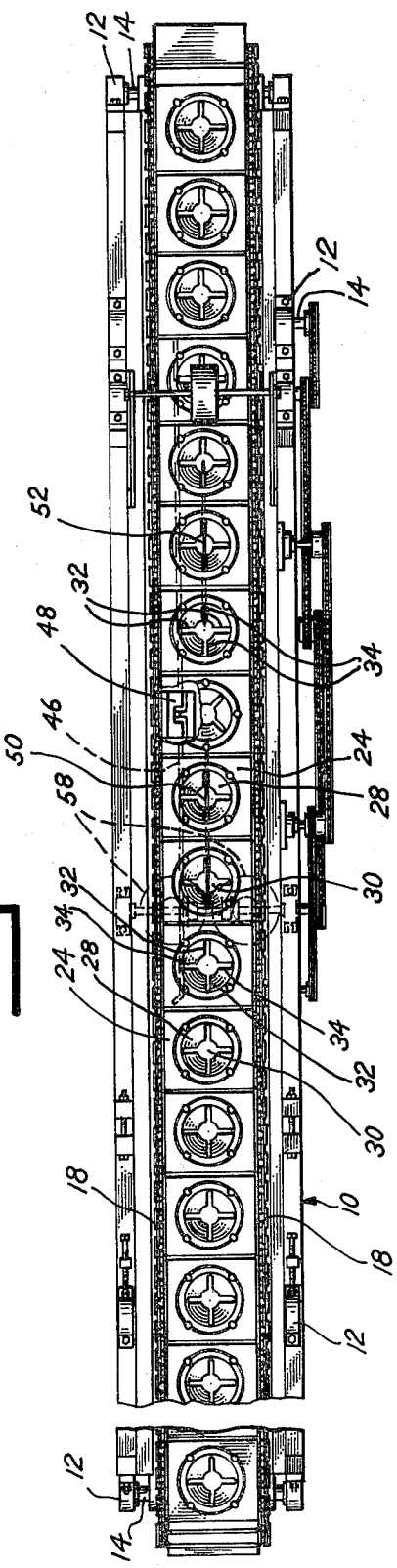
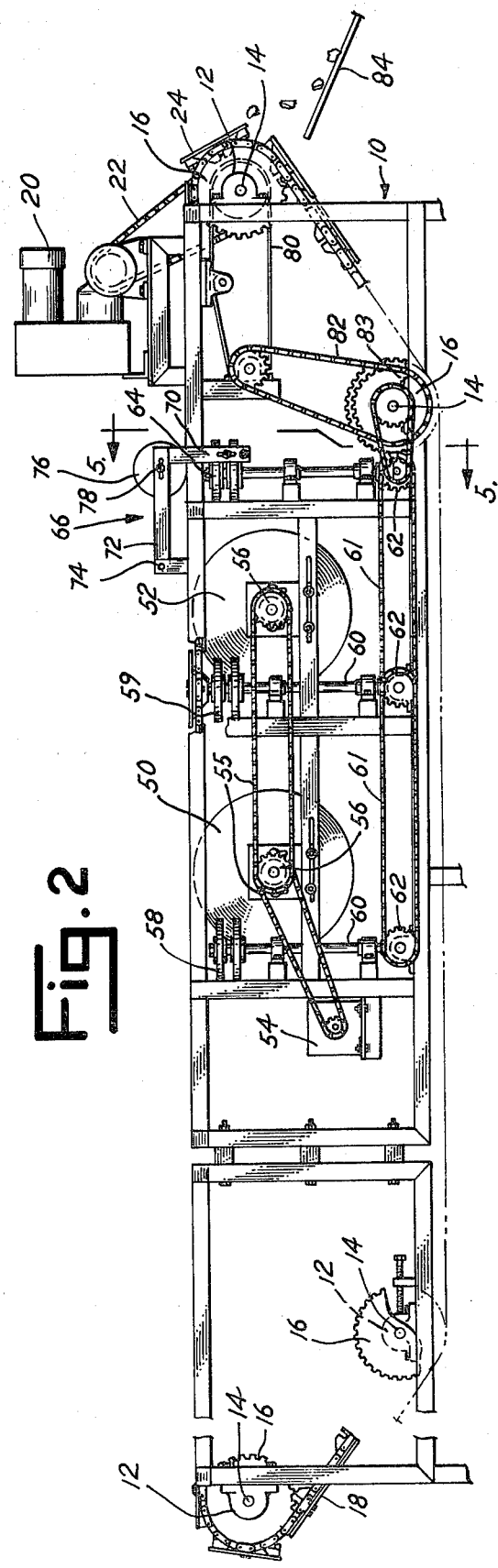

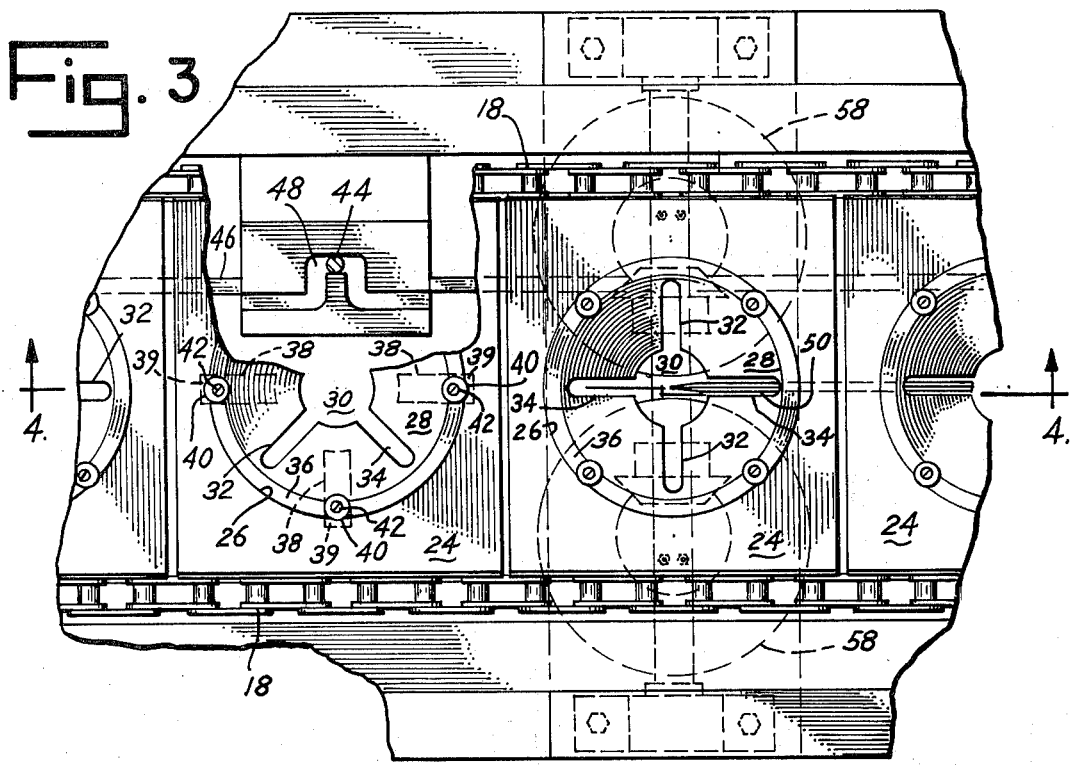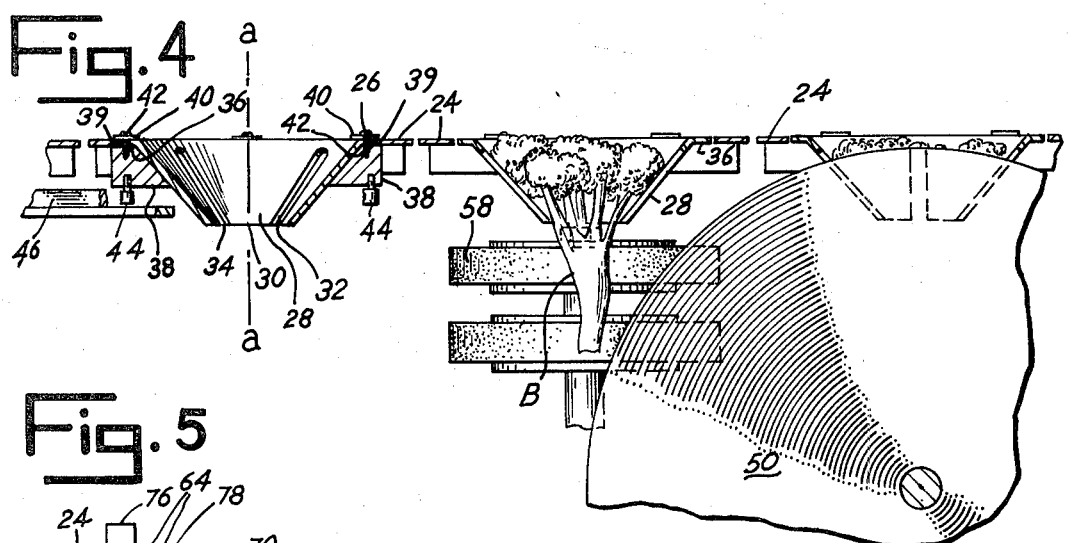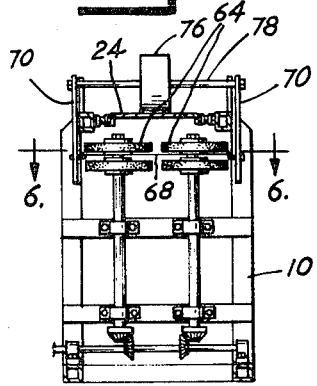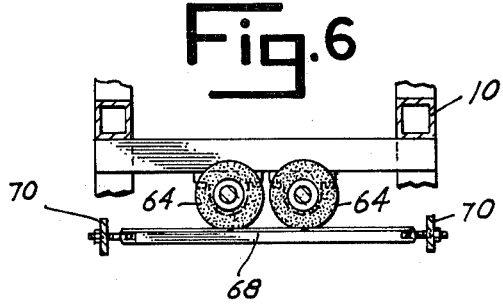

BROCCOLI QUARTERING MACHINE

BACKGROUND AND SUMMARY OF THE INVENTION

This invention relates to a vegetable cutting machine for cutting elongate vegetables and, more particularly, to a broccoli quartering machine.

It is frequently desirable that certain vegetables, such as broccoli, be cut and quartered lengthwise for freezing or other packaging. The cutting and quartering of broccoli has been accomplished by hand in the past. Such manual operation is obviously a laborious and tedious task requiring considerable manpower.

Several attempts have been made to mechanize this cutting and quartering operation. However, such prior broccoli cutting and quartering machines have suffered from one or more disadvantages. For example, some of the prior machines produced inconsistent cuts of broccoli and resulted in high waste because they required broccoli spears of uniform length for accomodation with the gripping and feeding devices of the machines. Moreover, difficulty in feeding the prior machines was frequently experienced because the broccoli frequently had to be positioned in clamps or other holding devices. Some of the other disadvantages of the prior machines were slow speed operation, creation of excess fines due to excessive handling or pressing of the broccoli during quartering, intermittent motion, removal of too much stem material, and incomplete cutting of the stems.

The broccoli quartering machine constructed in accordance with the principles of the present invention may be easily fed by any operator or may be adapted to mechanized feeding. The broccoli quartering machine constructed in accordance with the principles of the present invention readily accepts random length broccoli spears, precisely quarters the spears, and automatically cuts the quartered spears to a uniform length. In the broccoli quartering machine constructed in accordance with the principles of the present invention, the broccoli cuts are consistent and the stem is completely cut, and broccoli spears of random lengths may be easily and readily accomodated in the machine. The broccoli quartering machine of the present invention is capable of operation at high, continuous and uniform speeds and forces, particularly on the broccoli blossoms, are minimized thereby reducing the production of excess fines.

In a principal aspect of the present invention, a vegetable cutting machine for cutting elongate vegetables includes cutting means, vegetable holding means for holding the vegetable as the vegetable is being cut by the cutting means which includes substantially cup-shaped means through which the cutting means passes to cut the vegetables, and conveyor means for moving the holding means and cutting means relative to each other.

In another principal aspect of the present invention, first and second cutting means are present and the vegetable holding means comprises a resilient, substantially conical cup-shaped member, open at its apex, and at least two pairs of slots, one pair of which is adapted to receive the first cutting means, and the other pair of which receives the second cutting means after the cup-shaped member is rotated approximately 90° after the first cut, but before the second cut.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is an overall plan view of a preferred embodiment of broccoli quartering machine constructed in accordance with the principles of the invention;

FIG. 2 is a side elevation view of the broccoli quartering machine shown in FIG. 1;

FIG. 3 is a broken, enlarged plan view of a portion of the broccoli quartering machine shown in FIG. 1 showing in detail the conveyor and cup-shaped holding members, a portion thereof being broken away to show the guide strip and cam beneath the conveyor;

FIG. 4 is a broken, enlarged, cross-sectioned, side elevation view of the portion shown in FIG. 3;

FIG. 5 is a cross-sectioned, end elevation view of the stem cutting assembly as viewed along line 5—5 of FIG. 2; and FIG. 6 is a broken, cross-sectioned, plan view of the stem cutting assembly as viewed substantially along line 6—6 of FIG. 5.

DESCRIPTION OF THE PREFERRED EMBODIMENT

A preferred embodiment of a broccoli quartering machine constructed in accordance with the principles of the invention is shown in the drawings. The machine is preferably floor mounted and comprises a main frame 10 which may be formed of suitable structural materials, such as angle iron or the like.

A plurality of pillow blocks 12 are mounted at spaced ends of the machine to receive axles 14 for rotation therein. A pair of drive sprockets 16 are mounted, in spaced relationship to each other, on each of the axles 14 and a pair of endless chains 18 spaced a like distance from each other as the spacing of sprockets 16, are trained about each of the sprockets 16 to form, in effect, and endless conveyor.

A suitable main drive motor 20 may be mounted either beneath the upper flight of the conveyor or above the frame of the machine as shown in FIG. 2. The drive motor 20 is connected to one of the axles 14 by way of a drive chain 22 to drive the pair of chains 18.

Referring particularly to FIGS. 3 and 4, a plurality of rigid steel plates 24 are attached to and between links of the respective chains 18 and are driven by the chains in a linear path across the top of the machine. Each of the plates 24 may be ¼ inch thick steel and 9 to 10 inches wide and long. A circular opening 26 is formed in the center of the plates 24. The opening may be about 8 inches in diameter.

A resilient, cup-shaped member 28 is positioned in each of the plate openings 26. The cup-shaped member 28 is generally conical in shape having its apex removed to form a downward extending opening 30 at the bottom of the cup-shaped member. At least two pairs of slots 32 and 34, spaced 90° from each other, extend upwardly from the open apex 30 toward the base of the conical cup-shaped member terminating just short of the base. The slots may be about a half inch in width.

The cup-shaped members 28 may be formed of any suitable resilient substance, for example polyvinyl chloride. Although the cone angle is not critical, a cone angle of 45° has been found to be satisfactory.

Referring particularly to FIGS. 3 and 4, the base of each cup-shaped member 28 is slightly flanged at 36 and four blocks 38 are attached to the exterior of the cup-shaped member by suitable means, such as either by cementing, or other suitable mechanical fastening or both. The blocks 38 are mounted to the exterior of the cup-shaped member 28, in spaced relation to each other and midway between the slots 32 and 34. The upper edge 39 of each of the blocks 38 extends horizontally beyond the peripheral edge of flange 36 such that it underlies the underside of plates 24 to prevent movement of the cup-shaped member 28 upward through the opening 26 in the plates. A washer 40 is positioned above the plate 24 and is screwed, through the flange 36, to each of the blocks with screws 42. The washers 40, when affixed to the blocks 38, extend over the upper edge of the opening 26 in the plate to prevent the cup-shaped member 28 from falling downwardly through the plate. The washers 40, however, are not tightened so tight so as to prevent rotation of the cup-shaped member 28 about the vertical axis a-a as viewed in FIG. 4 and as will be described in more detail later.

A cam follower 44 is also mounted for rotation on the bottom edge of each of the blocks 38. At least two of the cam followers will contact a guide strip 46, as shown in FIGS. 3 and 4, upon entry into the cutting zones to insure that the cup-shaped member slots 32 or 34 are properly aligned with the cutting means. The guide strip 46 is attached to the machine frame 10 beneath the plates 24 and extends in the direction of movement of the plates. In addition, just following the first cutting means, a cam 48 is positioned beneath the conveyor and in transition to the guide strip 46 to receive the cam followers 44 which previously contacted the guide strip. Engagement of the cam 48 by the cam followers 44 effects rotation of the cup-shaped member 28 as will be described in more detail later.

Referring to FIG. 2, a pair of cutting discs 50 and 52 are mounted beneath the top flight of the conveyor. Although the cutters 50 and 52 are shown as rotating discs, other forms of cutters may be employed. The cutting discs are driven by a separate drive motor 54, drive chains 55 and sprockets 56. Each of the cutting discs 50 and 52 is positioned so that it extends into and passes through a pair of the slots 32 or 34 as each cup-shaped member 28 is moved over the cutting disc.

Two pairs of powered dual rubber rolls 58 and 59 are positioned just upstream of each of the cutting discs 50 and 52, respectively. Each of the power roll pairs is driven by way of a drive shaft 60, chains 61 and sprockets 62 from one of the powered axles 14 which axle, in turn, is powered by the main drive motor 20. The peripheral speed of the powered rolls 58 and 59 is adjusted by the sprocket ratio to be substantially the same as the speed of the cup-shaped members 28 as they move toward the cutting discs, because these rolls clamp the stems of the broccoli therebetween just prior to the commencement of cutting and thereby assist in holding and positioning the broccoli just before and at the beginning of cutting. The pairs of rolls 58 and 59 also assist in feeding the broccoli stem directly into the respective cutting discs as shown in FIG. 4.

Referring again to FIG. 2, another pair of powered dual rubber rolls 64 is also positioned downstream of the speed cutting disc 52 for grasping the quartered broccoli spears as they are cut to length by the cutting assembly 66. The powered pair of rubber rolls 64 are also driven at substantially the same peripheral speed as powered rolls 58 and 59 and off the same drive chain and sprocket 62.

Referring particularly to FIGS. 2, 5 and 6, the stalk cutting assembly 66 comprises a knife blade 68 positioned just downstream of the powered rubber rollers 64. The knife blade extends across the width of the machine and is mounted between a pair of generally vertical arms 70. A second pair of generally horizontal arms 72 are pivotally attached at 74 at one end to the machine frame 10 and at the other end to upper ends of arms 70. A resilient soft roller 76 is mounted for rotation on an axle 78 extending between the arms 72. The soft roller 76 normally rotates due to its contact with the upper surfaces of plates 24 as the plates move along their linear path, but rise to follow the contour of the heads of the broccoli spears, thereby raising and lowering the knife 68 automatically to result in a final quartered broccoli product of uniform length, even though the broccoli spears introduced to the machine are of random lengths.

Referring again to FIG. 2, an inclined lift belt 80, driven by way of chain 82 from a sprocket 83 on one of the axles 14 driven by motor 20, is positioned at the end of the upper flight of the conveyor so as to bear upward against the bottoms of the now quartered and cut broccoli spears and give them a lifting motion in their respective cup-shaped members 28 as the cup-shaped members 28 pass over the maximum elevation of the inclined lift belt. When each plate 24 and its cup-shaped member 28 passes around the discharge end axle 14 on the right end of the machine as viewed in FIG. 2, the quartered and cut broccoli spears which have been loosened in their cup-shaped member 28 by the lift belt 80, will be dumped into a suitable chute 84 or other collecting device for removal from the machine and conveying to other process points to make them ready for marketing.

Although it is believed from the above description of the preferred embodiment of machine of the present invention that its operation will be readily apparent, a brief description of the operation of the machine follows.

The operator will first energize the machine by providing power to drive motors 20 and 54. Once the machine is energized, the broccoli spears B to be cut and quartered are individually introduced, one to each of the cup-shaped members 28, at the left end of the machine as viewed in FIGS. 1 and 2. Such feeding may be done either by a suitable mechanical feeder or manually. The broccoli spears B are placed in the cups such that the stems extend downwardly through the opening 30 in each cup-shaped member 28 and the broccoli is retained in the cup by virtue of its enlarged blossom as viewed in FIG. 4.

A cup-shaped member 28, its plate 24, and the spear of broccoli B will be conveyed by chains 18 at a uniform, continuous speed toward the first cutting disc 50. When the cup-shaped member 28 nears the first cutting disc 50, a pair of the slots 32 will be accurately aligned with the plane of the cutting disc 50 so as to receive the cutting disc as shown in FIG. 3. This accurate alignment is caused by engagement of two of the cam followers 44 against the guide strip 46.

As the broccoli spear B approaches the first cutting disc 50, its downward extending stem which projects from opening 30 will be engaged and clamped between the first pair of resilient, powered dual rolls 58 to further align the stem in preparation for cutting, and to accurately feed the stem into the first cutting disc 50 to accurately halve the broccoli spear B.

As the now halved broccoli spear B leaves the first cutting disc 50, the lead cam follower 44, which previously engaged the guide strip 46, will enter the cam 48 which causes the entire cup-shaped member 28 and its halved broccoli spear B to be rotated 90° about vertical axis a-a as shown in FIG. 4 from its previous position. Thus, upon completion of this rotation about axis a-a, the pair of slots 32 which were previously aligned with the first cutting disc 50 will be rotated 90° in a counter-clockwise direction as viewed in FIG. 3, and perpendicular to the plane of the cutting discs, and the other pair of slots 34 which were previously perpendicular to the plane of the cutting discs will be rotated 90° and into alignment with the second cutting disc 52. Following the cam 48, the cam follower 44 which has just left the cam and another one of the cam followers 44 will again engage the guide strip 46 between the first and second cutting discs 50 and 52 to insure accurate alignment of the slots 34 with the second cutting disc 52.

Again, as the now halved and rotated broccoli spear B approaches the second cutting disc 52, it will be grasped and clamped between the second pair of resilient powered dual rubber rolls 59 which accurately align and feed the stem into the second cutting disc 52 to quarter the broccoli spear.

As the now quartered broccoli spear B and its cup-shaped member 28 and plate 24 leave the second cutting disc 52, the stem is again clamped, but now between the third pair of resilient powered dual rubber rolls 64 and is fed to the knife 68 which cuts the spear stem to length. The height of knife 68 will be automatically adjusted to the size of the particular broccoli spear by moving up and down in response to movement of roll 76 which rides over the contour of the broccoli spear blossom at the top of the cup-shaped member 28.

Finally, as the now quartered and cut broccoli spear B proceeds toward the end of the top flight of the endless conveyor, the bottoms of the spears will come into contact with the inclined lift belt 80 to urge the broccoli spear B upwardly and loosen them in their cup-shaped member 28 so that, as the angle of the plate 24 changes as it passes over the end of the machine, broccoli spear B will fall onto the discharge chute 84 and the empty cup-shaped member 28 will return back to the left end of the machine, as viewed in FIG. 2, to receive another uncut, unquartered broccoli spear.

It will be understood that the embodiment of the present invention which has been described is merely illustrative of one of the applications of the principles of the invention. Numerous modifications may be made by those skilled in the art without departing from the true spirit and scope of the invention.

What is claimed is:

1. A vegetable cutting machine for cutting elongate vegetables comprising cutting means, vegetable holding means for holding and aligning said vegetable with said cutting means as said vegetable is being cut by said cutting means and orienting said elongate vegetable such that its longer axis is vertical, said holding means comprising substantially cup-shaped means having an opening in the bottom thereof through which at least a portion of the elongate vegetable is adapted to extend beneath said cup-shaped means, said cutting means being positioned beneath said opening to cut at least a portion of the vegetable which extends from said opening and in a direction parallel to the vertical axis of said elongate vegetable, and conveyor means for moving said holding means and said cutting means relative to each other.

2. The vegetable cutting machine of claim 1 wherein said cup-shaped means is resilient.

3. The vegetable cutting machine of claim 2 wherein said cup-shaped means is substantially conical in shape and open at the apex thereof, said open apex extending downwardly toward said cutting means, whereby said vegetable extends from said open apex toward said cutting means.

4. The vegetable cutting machine of claim 1 including first and second cutting means, both said first and second cutting means passing through said cup-shaped means for cutting said vegetables therein.

5. The vegetable cutting machine of claim 4 including at least two pairs of slotted elongate openings in said cup-shaped means, said first cutting means passing through one pair of said slotted elongate openings and said second cutting means passing through the other pair of said slotted elongate openings when said cup-shaped means and said first and second cutting means are moved relative to each other.

6. The vegetable cutting machine of claim 4 including rotation means for rotating said vegetable after said vegetable is cut by said first cutting means, but before it is cut by said second cutting means.

7. The vegetable cutting machine of claim 6 wherein said vegetable is rotated approximately 90° between said first and second cutting means.

8. The vegetable cutting means of claim 6 wherein said rotation means comprises cam means for rotating said vegetable holding means between said first and second cutting means.

9. The vegetable cutting machine of claim 1 including means for clamping said vegetable as cutting by said cutting means commences.

10. The vegetable cutting machine of claim 9 wherein said means for clamping said vegetable comprises a plurality of powered resilient rollers.

11. The vegetable cutting machine of claim 9 wherein said cup-shaped means is substantially conical in shape and open at the apex thereof, said means for clamping said vegetable being positioned beneath said open apex and adjacent said cutting means.

12. The vegetable cutting machine of claim 1 wherein said conveyor means conveys said vegetable holding means with said vegetable therein toward said cutting means.

13. The vegetable cutting means of claim 12 including guide means for guiding said vegetable holding means toward said cutting means.

14. The vegetable cutting machine of claim 1 including first and second cutting means, cam follower means on said vegetable holding means, said cam follower means rotating said vegetable holding means between said first and second cutting means and guiding said vegetable holding means toward said first and second cutting means.

15. The vegetable cutting machine of claim 1 including first and second cutting means, said conveyor means comprising a plurality of rigid plate means positioned for movement in a linear path over said cutting means, each of said plates having an opening therein, said vegetable holding means comprising a plurality of resilient cup-shaped members one of each positioned in each said opening, said cup-shaped members being substantially conical in shape and open at the apex thereof, said apex extending downwardly through the opening in said plates, and mounting means for mounting said cup-shaped members in the opening of said plates for rotation in said opening as said cup-shaped members are moved between said first and second cutting means.

16. The vegetable cutting machine of claim 1 including additional cutting means positioned to cut said vegetables at an angle approximately 90° from the cut made by said first mentioned cutting means.

17. The vegetable cutting machine of claim 16 wherein said additional cutting means includes adjustment means for automatically adjusting the cut made by said additional cutting means on each said vegetable in response to the length of each said vegetable.

18. The vegetable cutting machine of claim 1 including first and second cutting means, said conveyor means conveying said vegetable holding means with said vegetable therein toward said first and second cutting means, said conveyor means comprising a plurality of rigid plate means positioned for movement in a linear path over said first and second cutting means, each of said plates having an opening therein, said vegetable holding means comprising a plurality of resilient cup-shaped members one of each positioned in each said opening, said cup-shaped members being substantially conical in shape and open at the apex thereof, said apex extending downwardly through the opening in said plates, mounting means for mounting said cup-shaped members in the opening of said plates for rotation therein about an axis substantially perpendicular to said linear path, at least two pairs of slotted openings in said substantially conical, cup-shaped members extending from the open apex thereof toward the base of said cone, cam means, guide means, and cam follower means on each said substantially conical, cup-shaped member positioned to engage said guide means to align one pair of said slotted openings such that said first cutting means passes therethrough and the other pair of said slotted openings such that said second cutting means passes therethrough, and to engage said cam means to rotate said substantially conical cup-shaped member approximately 90° between said fist and second cutting means.

19. The vegetable cutting machine of claim 18 including resilient means for clamping said vegetable to align said vegetable for cutting by said first and second cutting means.

20. The vegetable cutting machine of claim 18 including third cutting means positioned to cut said vegetables at an angle approximately 90° from the cut made by said first and second cutting means.

21. The vegetable cutting machine of claim 18 wherein said third cutting means includes adjustment means for automatically adjusting the cut made by said third cutting means on each said vegetable in response to the length of each said vegetable.

22. The vegetable cutting machine of claim 18 including loosening means to loosen said vegetable from said cup-shaped members upon completion of cutting.

23. The vegetable cutting machine of claim 22 wherein said loosening means comprises inclined belt means positioned to bear against said vegetable.

24. The vegetable cutting machine of claim 1 wherein said conveyor means moves said holding means at a uniform continuous speed.

25. The vegetable cutting machine of claim 9 wherein said means for clamping said vegetable is positioned to clamp the portion of the vegetable extending from said opening.

26. The vegetable cutting machine of claim 1 including at least one pair of slotted openings in said cup-shaped means and extending from said opening in the bottom upwardly, said cutting means being positioned to pass through said slotted openings into said cup-shaped means to cut at least a portion of the vegetable in the cup-shaped means.

27. The vegetable cutting machine of claim 26 wherein said cutting means is positioned to cut some, but not all of the vegetable in said cup-shaped means.

28. A vegetable cutting machine for cutting elongate vegetables comprising
   cutting means,
   vegetable holding means for holding and aligning said vegetable with said cutting means as said vegetable is being cut by said cutting means, said holding means comprising substantially cup-shaped means substantially conical in shape and having an opening in the bottom at the apex thereof through which at least a portion of the elongate vegetable is adapted to extend beneath said cup-shaped means, said cutting means being positioned beneath said opening to cut at least a portion of the vegetable which extends from said opening,
   clamping means for clamping said vegetable as cutting by said cutting means commences, said clamping means being positioned beneath said open apex and adjacent said cutting means, and
   conveyor means for moving said holding means and said cutting means relative to each other.

* * * * *